June 5, 1945.  C. E. HANNUM  2,377,341
CAMERA AND THE LIKE
Filed Oct. 22, 1941
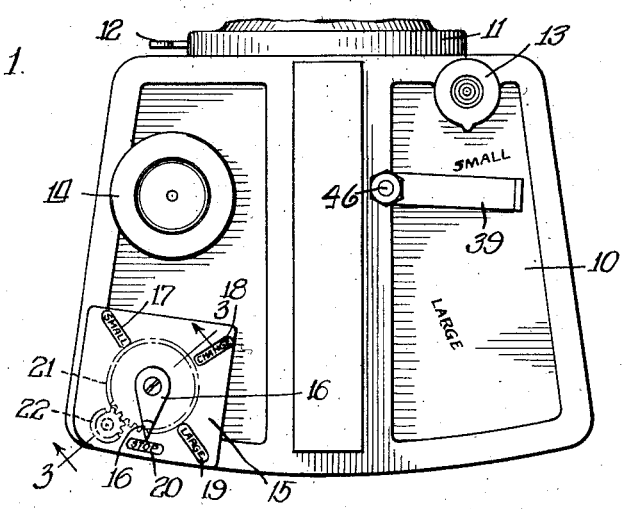
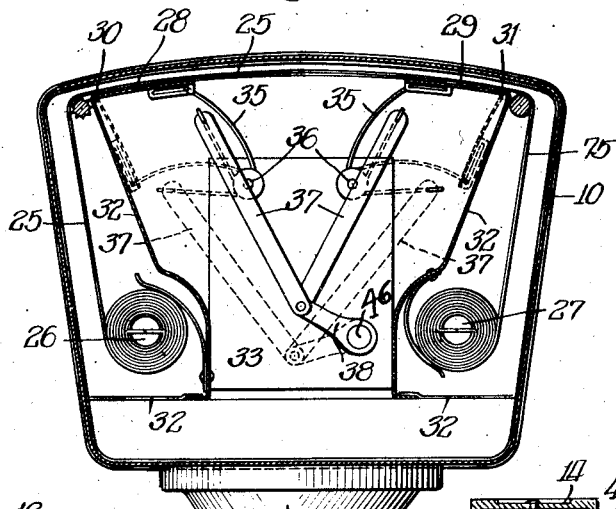
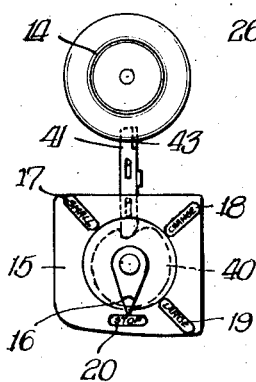
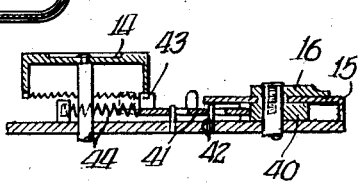
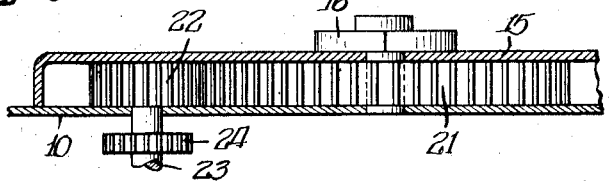
INVENTOR.
Clement E. Hannum.
BY Patented June 5, 1945

2,377,341

UNITED STATES PATENT OFFICE 2,377,341

CAMERA AND THE LIKE

Clement E. Hannum, Chicago, Ill.

Application October 22, 1941, Serial No. 416,037

7 Claims. (Cl. 95—31)

This invention has to do with improvements in cameras. More particularly, my invention relates to an improved arrangement whereby the amount of film exposed in making a picture, may be varied for each exposure on a roll, thus varying the size of the picture. In other words, it is an object of this invention to provide an arrangement whereby the operator may select a small or large exposure on the film by a simple operation which is easily performed by even unskilled photographers.

It is a further object to provide an arrangement whereby the operator may block out a portion of a film in a camera normally adapted to large exposures, and thus secure a small exposure area of the film, resulting at the taking of the picture, in a small snapshot or photograph. This results in adapting a large camera to small pictures, at the same time leaving it easily useful for large pictures.

In connnection with the above, it is an object to provide an arrangement in which none of the film is wasted over and above what would normally be wasted in taking ordinary pictures with a common camera of standard size. This accomplishes the object of providing for a series of pictures of possible different size, without waste of film due to change of size. Frequently, in the past, the operator of a camera would not wish to waste expensive film on a picture which he would have taken if he had not had to use a large exposure, and he would take the picture if he could do so with the use of a small camera. The arrangement I have provided has the advantages of both a large and a small camera, all in one.

In connection with the above, it is one object to provide a means of pre-determining the size of the length of film to be moved into exposure position for a particular picture exposure, and for metering or measuring the proper amount for the particular size as the film is moved into the exposure position. In one arrangement, this metering shows the person winding the film when the proper position has been reached and he is thus able to stop at the correct time. In an alternative construction I have provided an improved arrangement wherein the film winding mechanism is locked automatically when the correct amount of film has been moved into place (the amount having been predetermined and the device "set" for that movement).

The arrangement above mentioned accomplishes the further object of preventing overlapping of exposures, and of preventing improper spacing between exposures.

Further, I disclose an arrangement in which the exposure opening between the shutter panels, is, for each size of picture taken, correctly centered. This is desirable, if not essential, to the correct operation of the film winding and metering mechanism above mentioned.

I have thus provided a device in which the operator, by a simple setting of an indicator, and movement of the film to the position shown by the indicator, and by simply moving a small lever, secures a film exposure area of desired selection from a plurality of sizes, and thus may take the size of picture that suits his tastes.

It is an object to provide a device which requires the operator to re-set the device before he takes a subsequent picture each time he makes an exposure, and this has an influence on the operator in preventing double exposures.

It is a further object to provide a device which is relatively inexpensive to manufacture, which can be operated by the average person with a few simple instructions, and which will make the camera constructed with the improvements therein, more flexible in use and economical to operate.

Other objects and advantages of my invention will appear as the nature of the improvements is better understood, the invention consisting substantially in the novel construction, combination and arrangement of parts hereinafter fully described, illustrated in the accompanying drawing, and finally pointed out in the appended claims.

In the drawing:

Figure 1 is a top plan view, showing a box type camera of the popular style, to which my invention has been added, the view illustrating particularly the metering device or indicator and the size control lever of one embodiment of my invention;

Figure 2 is a bottom view as compared to Figure 1, the view being in cross section and illustrating the internal mechanism of one embodiment of my invention;

Figure 3 is an enlarged, fragmentary, cross-sectional view, substantially on the line 3—3 of Figure 1, looking in the direction of the arrows, the view illustrating particularly the operating mechanism for the indicator;

Figure 4 is a top plan view, showing a modified arrangement of metering device or indicator (hereinafter termed the indicator), the film winding mechanism having a positive stop arrangement, herein sometimes referred to as automatic film stop and re-set mechanism; and Figure 5 is a fragmentary, side elevational view showing in cross section the device of Figure 4.

Referring more in detail to the arrangement shown in the various drawings, and first to the arrangement shown in Figures 1 and 2, I have illustrated my invention as being incorporated in an ordinary box camera 10, various styles and sizes of such cameras now being on the market.

This camera has the ordinary lens portion 11, distance adjustment 12, shutter release 13, and film winding knob 14. These parts 11, 12, 13, and 14, are all common to box type cameras in general.

I have provided the indicator arrangement 15, (Figures 1, 3, 4, and 5), which comprises the pointer 16, and an indicating dial having the markers 17, 18, 19, and 20. As I have shown them for purposes of this application, the marker 17 is "small"; the marker 18 is "change"; the marker 19 is "large"; and the marker 20 is "stop." Other appropriate indicia or wording may be substituted without detracting from the invention.

The pointer 16 is preferably secured by a friction fit to the axle portion of the gear wheel 21, which is here shown as meshing with the pinion 22 (see Fig. 3). The pinion (or small gear wheel) 22 generally is integral with, or firmly attached to, the film actuated roller 23, which, in turn, is shown as having the film engaging toothed wheel or cog 24. The cog 24 engages the film (generally at the edges) by its teeth and thereby forms a positive driving means for the pinion 22, gear wheel 21, and (through friction of the pointer with the axle of gear wheel 21) the pointer 16.

When the film is inserted in the camera (the film is shown in operative arrangement in Fig. 2, being indicated as film 25 on winding roller 26 and stretched across the back of the camera to film roller 27), the roller 23, through the roller cog 24, engages the film and turns as the film is wound off film roller 27 on to the winding roller 26. This turns the gear wheel 21 and therethrough, the pinion 22, and the pointer 16. The film is ordinarily initially wound up to a position shown by the camera film window to be at or adjacent the numeral 1 on the film strip. If the first exposure is to be small, the operator can safely stop winding prior to reaching the numeral 1 on the film strip by an amount equal to the width of the panel 28 (hereinafter described), which can usually be estimated from markings on the back of the film by an experienced operator. The panels (hereinafter described in detail) are then set for the size of exposure selected and the picture "shot" without being concerned with the markers and pointer; for the second shot or exposure, however, the indicator arrangement provided is necessary.

If the first picture has been small, and it is desired to make the next subsequent picture small, then the pointer is moved by the operator (independently of the winding arrangement and by turning the pointer on its axle, a friction fit being provided for that purpose) to the position marked "Small," being marker 17. The film winding knob 14 is then turned to advance the film, which turns the film actuated roller 23, and through said roller 23, pinion 22 and gear wheel 21, likewise turns the pointer. The winding knob is turned until the pointer reaches the "Stop," after which the film is in position for a second small exposure. This procedure is continued (repeated) so long as small exposures are to be taken, that is, so long as the small is the desired size rather than the large.

If the initial picture is a large exposure, the film would be initially set in the same way as in any ordinary camera, that is, it would be wound to the numeral 1 indicating the first exposure on the film, and the first picture could then be taken. If the operator desired the next picture to be the same size, that is, large, he would set the pointer 16 on the marker 19, (large), and wind the film winding knob 14 until the pointer indicated marker 20 (stop). The device would then be set for another large exposure, so far as the film is concerned.

If, however, the initial picture is small, and it is desired to change to the large size for the next subsequent size, the pointer would be manually moved as above described, but would be set on the marker 18 (change), and the film winding knob turned an amount to bring the pointer 16 to the marker 20 (stop). The same is true when a change from large size to small is necessary. The pointer is initially set at marker 18 (change) before winding the film for the exposure.

It is therefore clear that where there is no change in size desired for the next subsequent exposure, the pointer is set on the marker indicating the size of exposure desired before winding the film, and the film is wound until the pointer 16 reaches the marker 20 (stop) after which the film may be exposed. However, wherever a change in size is desired, from small to large or from large to small, the pointer 16 is always set on the marker 18 (change) before winding the film, the pointer returning to the marker 20 (stop) in the winding operation.

Referring next to the modification shown in Figures 4 and 5, I include an arrangement which will stop the film winding mechanism automatically when the pointer reaches the marker 20 (stop) after setting and winding as above described, and which requires that the operator reset the pointer 16 before proceeding to wind the film for the next exposure. This lessens the chance of double exposure because of the operator forgetting to rewind, and assures accuracy in the film winding operation. I provide a cam 40, riveted, or otherwise operatively attached to move with the pointer 16. Thus when the pointer 16 moves, the cam 40 moves the same way, whether the movement was caused by manipulating the pointer by the operator or by movement of the gear wheel 21 when the film is rolled. This cam has a recessed portion into which drops the slide bar 41 when the pointer is at the marker 20 (stop). However, manually turning the pointer pushes the slide-bar 41 out of the recess of the cam 40, with the results hereinafter described.

The slide-bar 41 is held in slidable position on the camera by any convenient means, such as the pins 42. The slide-bar 41 preferably contacts, when the position of the cam is such that one end of the slide-bar is in the cam recess, an edge or other portion of the winding knob 14. For this purpose the slide-bar may be provided with the boss 43 at its end most distant from the cam 40, and the winding knob 14 is preferably provided with knurled or serrated edge portions into which the boss 43 "seats." Spring means, such as the coil spring 44, is provided to exert tension on the slide-bar 41, moving it against the cam under pressure. Thus, when the pointer 16 is manually turned thus forcing the slide bar 41 out of the cam recess, the slide bar moves to the position shown in dotted lines in Fig. 5, and releases the film winding knob, until, by rotation of the film winding knob and consequent movement of the film and cam (or if desired by manual movement of the cam—which is not likely) the slide-bar 41 again drops into the cam recess and locks the film winding mechanism.

Referring next to Figures 1 and 2 in particular, I have provided the adjustable panels 28 and 29, which are shown in a preferred embodiment. They are journaled on pin hinges or the like, at 30 and 31 respectively, where they "meet" the sidewalls 32 to an extent that they close off light filtering to any objectionable amount between the panel and the adjacent sidewall. The panels 28 and 29 may be located elsewhere within the exposure chamber, but the arrangement I believe cheapest and most advantageous for several reasons is to have them located substantially as shown in the drawing. These panels 28 and 29 are shown as provided with a convenient manipulating and holding means, which as shown comprises a pair of spring members 35 attached to the panels 28 and 29 by means of the slots 34, and rotatably journaled on the respective pin members 36. The spring members (in each instance) have the opposite ends (to that attached to the panels 28 and 29) attached to the arms 37 (one spring to one arm and the other spring to the other arm, as shown in the drawing Figure 2). These arms 37 lie adjacent the top of the exposure chamber in one desirable arrangement, and do not interfere materially with the light upon exposure. The panels 28 and 29, of course, extend substantially the full height of the interior of the exposure chamber, and fully block exposure of their respective contiguous portions of the film when they are in the "open" position, that is, are swung out so that one edge is away from the side wall 32 for each panel. In this last mentioned position they admit only enough exposure light to make a picture of the size herein designated as small.

The arms 37 are rotatively attached at the ends away from the springs 35, to a crank arm 38, which is preferably fastened in turn by an axle means 46 through the top of the camera to the lever 39. This lever 39 is movable on the outside of the camera, around its axle 46, to which it is keyed or otherwise attached for movement with the axle, which movement is transmitted through the axle 46 and crank arm 38 to the arms 37 and springs 35, resulting in a shift in the direction of the tension on the springs 35, and in consequent change in position of the panels 28 and 29, thus opening or closing said panels 28 and 29, as the case may be. The position of the various last abovementioned parts, shown in heavy lines in Figure 2, show the panels in open position for the making of a small exposure, whereas the parts shown in dotted lines shows the various positions of the different elements when a large exposure is made, that is, when the panels 28 and 29 are "closed" against the side walls 32.

In actual operation, the film winding mechanism and pointer setting must be coordinated or "synchronized" with the setting of the panels. The lever 39 may have proper position for each setting indicated on the camera, but generally that is unnecessary inasmuch as only two positions are generally used. If a large picture is desired and the film set therefor as above provided, the lever 39 (and therefore the other mechanism operated thereby as above described) must be set for the position where the panels 28 and 29 are "closed" against sidewall 32. If the film is manipulated for a small picture, then the panels must be manipulated for a small exposure. Operation of the film and panel mechanism therefore depend upon each other and must be synchronized or coordinated.

It will thus be seen that in this arrangement the operator has a choice of size of pictures he will take for each exposure of the film, and that where small exposures are made, or are interspersed with large pictures, a considerable saving of film will result.

The form of invention herein shown and described presents a preferred embodiment thereof, and delineates its adaption to practical use, but it is to be understood that the present disclosure is to be considered from the illustrative standpoint, and not as imposing unnecessary restrictions and limitations on the invention.

While I have herein shown and described certain features of my invention, still I do not wish to limit myself thereto except as I may do so in the claims.

I claim:

1. A camera of the box type having the usual casing, film and film rolling mechanism, lens means, shutter and shutter operating means, and film exposure chamber with side walls; said camera having means varying the size of the strip of film exposed for a picture, said means comprising a plurality of adjustable panels hinged in a position whereby the panels are adjacent the ends of the respective side walls nearest the film exposure opening of the film exposure chamber, spring means under tension retaining said panels in preselected position, lever means outside said casing, a crank arm connected to and operable by said lever means, means varying the position of the panels by varying the spring tension, comprising arms attached to said crank arm operated by said lever, said arms being connected to said spring means, indicating means in connection with said lever indicating the position of the panels at any given time, said camera having film regulating means synchronized with said panel means whereby the movement of the film to the exposure position is indicated and synchronized with the panel means for each size of exposure, the film regulating means comprising a roller engaging the film within the camera, a pointer on the outside of the camera, gear means between said roller and said pointer, said pointer having a friction engagement on the shaft of one gear means, and markers indicating the positions to which the pointer is moved for the respective size of the film exposure.

2. A camera of the box type having the usual casing, film and film rolling mechanism, lens means, shutter and shutter operating means, film exposure chamber; said camera having means varying the size of the strip of film exposed for a picture, said means comprising adjustable panel means, lever actuated spring means retaining said adjustable panel means in pre-selected position, said means being operable for varying the position of the panels, indicating means indicating the position of the panels at any given time; said camera having film regulating means comprising a pointer synchronized with the film, markers indicating the predetermined position to which the pointer is moved by movement of the film for each exposure, the entire arrangement being such that the operator selects the size exposure he wishes to make, positions the panels, moves the film to a position indicated by the pointer, and is ready to snap his picture.

3. A camera of the box type having the usual casing, film and film rolling mechanism, lens means, shutter and shutter operating means, and film exposure chamber with side walls; said camera having means varying the size of the strip of film exposed for a picture, said means comprising a plurality of adjustable panels hinged in a position whereby the panels are adjacent the ends of the respective side walls nearest the film exposure opening of the film exposure chamber, a lever, a crank arm operated thereby, spring means under tension retaining said panels in preselected position, means varying the position of the panels by varying the spring tension, comprising arms attached to said crank arm operated by said lever, said arms being connected to said spring means, indicating means in connection with said lever indicating the position of the panels at any given time, said camera having film regulating means synchronized with said panel means whereby the movement of the film to the exposure position is indicated and synchronized with the panel means for each size of exposure.

4. A film control and indicaitng means for a camera, comprising a film winding mechanism having a film winding knob, film movable by said film winding mechanism upon turning said film winding knob, means including a roller driven by movement of said film, an indicator pointer carried by said last mentioned means, a cam means attached to said indicator pointer, means holding the film winding knob against movement, said means comprising a slide bar with a boss thereon engaging said film winding knob, said slide-bar means likewise engaging said cam and pointer, whereby movement of said pointer to a predetermined position moves the cam and disengages the slide-bar from said film winding knob, and whereby movement of said film winding knob, after disengagement of said slide-bar, moves said pointer and cam a predetermined amount and causes said slide bar to reengage and lock said film winding knob, the initial setting of said pointer being indicated by markers provided on said camera means.

5. An arrangement as set forth in claim 1, wherein the pointer is provided with a cam arrangement which moves with movement of the pointer, and wherein the film winding mechanism includes a film winding knob with locking means adapted to be released by movement of the cam a predetermined amount said locking means again locking the film winding knob upon movement of the film winding knob a predetermined further amount based upon the amount of the initial movement of the cam as compared to the length of the circumference of the cam.

6. A camera of the box type having the usual casing, film and film rolling mechanism, lens means, shutter and shutter operating means, and film exposure chamber; said camera having means varying the size of a strip of film exposed for a picture, and likewise having means pre-set each time an exposure is made and indicating the movement of the film necessary for the desired size of film exposure, said film regulating means comprising a roller engaging the film within the camera, a pointer on the outside of the camera, gear means between said roller and said pointer, said pointer having a friction engagement on the shaft of one gear means, and markers indicating the positions to which the pointer is moved for the respective size of the film exposure, the arrangement being such that the pointer is provided with means comprising a cam moving with movement of the pointer and wherein the film winding mechanism includes locking means releasable by movement of the cam abovementioned, said locking means locking the film winding means upon movement of the latter a predetermined amount.

7. A camera having means varying the size of a film exposed for a picture, said means being operable by closing off a portion of the exposure chamber between the shutter of the camera and the film, indicating means indicating the position of said above-mentioned means for varying the size of a film exposure and means variable in setting for each size exposure and regulable for predetermining the movement of the film to the exposure position for the preselected size of exposure desired, the arrangement being such that the means determining the movement of the film has a positionable indicator with locking means releasable by manual operation, said locking means operating automatically to lock the indicator upon a predetermined amount movement after the indicator has been positioned as above indicated.

CLEMENT E. HANNUM.